United States Patent

[11] 3,625,767

| [72] | Inventors | Robert P. Clark;<br>Kenneth R. Grothaus, both of<br>Albuquerque, N. Mex. |
|---|---|---|
| [21] | Appl. No. | 885,791 |
| [22] | Filed | Dec. 17, 1969 |
| [45] | Patented | Dec. 7, 1971 |
| [73] | Assignee | The United States of America as represented by the United States Atomic Energy Commission |

[54] THERMAL BATTERY
10 Claims, 4 Drawing Figs.

| [52] | U.S. Cl. | 136/83 |
|---|---|---|
| [51] | Int. Cl. | H01m |
| [50] | Field of Search | 136/83, 153, 86, 87, 90, 112, 225 |

[56] References Cited
UNITED STATES PATENTS

| 3,345,214 | 10/1967 | Zauner et al. | 136/137 |
| 3,404,037 | 10/1968 | McCarter | 136/83 |
| 3,425,872 | 2/1969 | Levy | 136/83 |
| 3,445,289 | 5/1969 | Nerwin, Jr. et al. | 136/83 |

*Primary Examiner*—Anthony Skapars
*Attorney*—Roland A. Anderson

ABSTRACT: A high-voltage thermal battery capable of miniaturized construction including one or more heat-conductive and electrical-insulative casings having one or more internal passageways, a plurality of electrical battery cells stacked in the casing passageways in electrical series with each cell having alternating layers of cathode-anode electrodes and fusible electrolyte members, and means for generating heat disposed about the casing or casings.

PATENTED DEC 7 1971 3,625,767

INVENTORS
ROBERT P. CLARK
KENNETH R. GROTHAUS

THERMAL BATTERY

BACKGROUND OF INVENTION

Thermal batteries utilize electrochemical cells which are activated by heat to produce electricity. The cell generally includes suitable anode and cathode elements separated by an electrolyte which is solid and nonconducting at normal or ordinary operating temperatures. When the battery is heated to the melting temperature of the electrolyte, the electrolyte may fuse or melt and become conductive. With the electrolyte in the liquid and conductive state, the battery may produce electricity by well-known electrochemical reactions.

Since electrochemical cells in thermal batteries are limited as to the voltage which may be generated by a single cell, a large number of cells may be connected in electrical series to achieve high-voltage capabilities. The high-voltage capabilities of such batteries may be limited only by size requirements and internal resistance.

The size limitations may become particularly critical in those thermal batteries which incorporate within the battery some form or type of heat-generating system. This heat-generating system, which may be a pyrotechnic material or some other type of material which produces heat from an exothermic reaction, may be disposed within and form a part of each electrochemical cell or pairs of cells. As the voltage requirements are increased and therefore the required number of cells increased to produce this voltage, it may be readily seen that the heat-generating means may contribute a disproportionately large portion of the total volume of the battery and present a real limit to the miniaturized size of the battery.

In these thermal batteries, a major problem may be presented in reliably igniting each and every one of the heat-generating means at a relatively rapid rate and in relative simultaneity. Also, the fact that the heat-generating means may be in direct contact with the active electrochemical materials within the cell may subject the cells and cell materials to a very high flash temperature upon ignition of the heat-generating means. Such temperatures may cause or enhance detrimental effects on the electrochemical system by undesirable side reactions.

SUMMARY OF INVENTION

In view of the limitations of the prior art as noted above, it is an object of this invention to provide a thermal battery having high-voltage capabilities in a relatively small volume.

It is a further object of this invention to provide a miniaturized high-voltage thermal battery having a relatively long term generating capability.

Various other objects and advantages will appear from the following description of embodiments of the invention, and the most novel features will be particularly pointed out hereinafter in connection with the appended claims. It will be understood that various changes in the details, materials and arrangements of the parts, which have been herein described and illustrated in order to explain the nature of the invention, may be made by those skilled in the art.

The invention comprises a thermal battery having heat-conductive and electrical-insulative casings or containers with thermal battery cells therein and means for generating heat disposed about the outer surface of the casing.

DESCRIPTION OF DRAWINGS

The different aspects of the present invention are illustrated in the accompanying drawings wherein.

DETAILED DESCRIPTION

Figure 1:
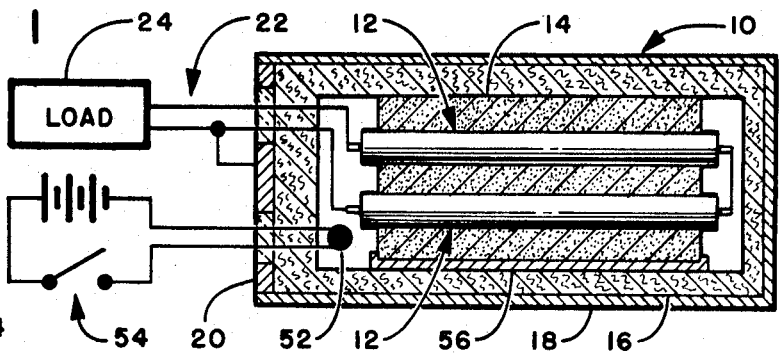
FIG. 1 is a cutaway elevation view of a thermal battery incorporating features of this invention.

Referring to FIG. 1, thermal battery 10 may include one or more battery cell stacks 12 arranged in an appropriate manner within and generally surrounded by a heat-generating means or heat block 14. The heat-generating means and cell stacks may in turn be encased within suitable heat insulation 16 and battery enclosure or case 18. Battery cell stacks 12 may be connected in electrical series or parallel with appropriate leads and connected through header 20 by terminals 22 to some suitable external load 24.

Figure 2:
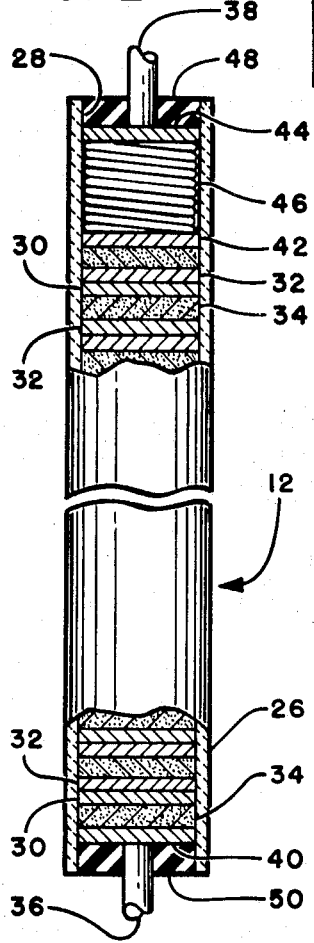
FIG. 2 is a partially cutaway elevation view of a typical cell stack utilized in the battery of FIG. 1.

Battery cell stack 12 includes an outer casing 26 enclosing a stack or column of battery cells arranged in electrical series within a cavity 28 thereof. Casing 26 is preferably made of a material having high heat-conductivity and high electrical-insulative properties. A particularly suitable material for casing 26 may be beryllium oxide formed in a tube as shown or in any other convenient configuration having one or more cavities 28 for receiving the stacked cells. Other less desirable materials may include alumina or silica. The individual battery cells may be made of any suitable electrochemical system having spaced-apart anode and cathode electrodes sandwiched around or separated by an electrolyte, the electrolyte being preferably solid and nonconductive at usual operating temperatures and highly conductive when melted. The electrolyte may include a depolarizer which may be reduced at the cathode and a binder to prevent the electrolyte and depolarizer from deforming when the electrolyte melts. Such an electrochemical system may include a calcium anode, an iron cathode, and a lithium chloride-potassium chloride eutectic electrolyte. The depolarizer in such a system may be calcium chromate with a molecular sieve, finely divided silica or kaolin clay binder. The electrolyte-depolarizer-binder (DEB) may be mixed in powder form and pressed into homogeneous pellets, hereinafter referred to as a DEB pellet. The anode and cathode may be formed in metallic discs by electroplating or otherwise depositing one of the materials onto the other to form a unitary bimetallic member. The electrolyte-impregnated material may be bonded to the bimetal member, if desired, to form a laminate which may then be cut in a single operation to fit within casing 26. As shown in FIG. 2, the battery cells are formed from an anode 30, cathode 32 and DEB pellet 34 with a unitary anode and cathode having a surface lying adjacent each other in contiguous cells and with marginal portions of the electrodes and pellets in electrical and heat conductive contact with internal wall portions of casing 26.

Battery cell stack 12 may include appropriate anode and cathode terminals 36 and 38 at each end of the stack for connection to other battery cell stacks or to the output terminals of the battery. Anode terminal 36 may be connected to an appropriate electrode 40 made of the same or similar materials as anode 30 or of a composite material having an appropriate electrochemical reaction with the adjoining DEB pellet 34.

Cathode terminal 38 may be connected to an appropriate cathode-type electrode, such as electrode 42, or it may be connected, as shown, to an intermediate electrode 44 and coupled to electrode 42 through an appropriate conductive compression spring or bias member 46. Compression spring 46 may maintain contact pressure between the individual battery cells during operation, especially upon heating the battery stack to the electrolyte melting temperature. Terminals 36 and 38 may be enclosed by suitable conductive or nonconductive plug members 48 and 50 to provide the desired sealing and mechanical strength for the battery cell stack.

Heat-generating means 14 may be made of any appropriate material or combination of materials which may be ignited or otherwise reacted to produce a high level of heat energy. Such materials may include exothermically reacting chemicals or the like such as certain alloy mixtures, pyrotechnics such as thermite mixtures and heat powder, hypergolic materials, etc. For example, the heat-generating means 14 may be made from an iron-potassium perchlorate mixture suitably formed or pressed into the desired shape to fit about and be coextensive with a substantial portion or all of the outer surface of cell stacks 12. Heat-generating means 14 may be ignited by any appropriate initiator, such as by an electrical match or primer 52 energized by a conventional electrical energy source 54 or by impact. In order to insure ignition of the pyrotechnic mixture or other heat-generating means, it may be desirable to utilize an easily ignitable material, such as a fuse strip 56, which is in intimate contact or contiguous with heat-generating means 14 over a large portion thereof. Thus, match 52 may ignite fuse strip 56 which in turn ignites heat-generating means 14. An appropriate fuse strip may be made of materials such as zirconium-barium chromate or any other commercially available fuse-type material.

Insulation 16 may be any appropriate material which will withstand the high temperatures generated by heat-generating means 14 and contain heat energy produced thereby for some desired length of time. The greater the insulative qualities of insulation 16 and the more insulation used, the greater the length of the output pulse generated by the battery. Suitable insulation may include silica, alumina, asbestos or mixtures thereof.

Thermal battery 10 is shown with two battery cell stacks 12 arranged in an appropriate manner within casing 18. Battery case 18 may be made in any appropriate shape, such as circular or rectangular, with the cell stacks and heat-generating means and insulation suitably disposed throughout to provide the desired heat energy to the battery stacks. The shape of case 18 may be dictated by the number and shape of the cell stacks to provide the most compact design.

Figure 3:
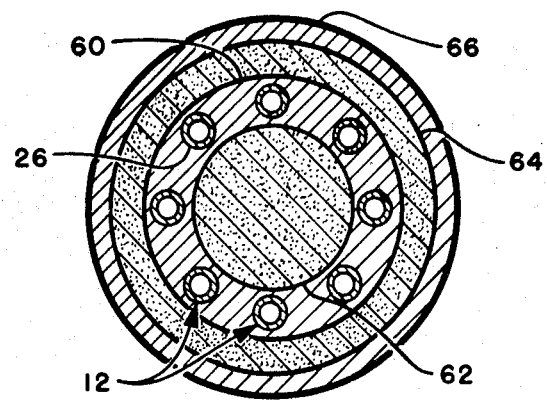
FIG. 3 is a cutaway view of an alternate thermal battery configuration.

Another effective battery embodiment may be that shown in FIG. 3, wherein the battery cell stacks 12 are arranged in an annular configuration within a tubular-shaped member 60 having a plurality of longitudinal passages or cavities therethrough for receiving the battery cell stacks. In this embodiment, member 60 is preferably highly heat conductive so as to transfer the heat energy rapidly and uniformly to the cell stacks. In such a battery, member 60 may be an electrically conductive metal such as aluminum or copper. Electrical isolation may be maintained between annular member 60 and the battery cells in battery cell stack 12 by casing 26. Separate tubular 62 and annular 64 heat-generating means may then be disposed about the inner and outer surfaces of member 60 as shown and the entire unit cased in a suitable shell 66. The ends of the central and outer heat-generating means may be interconnected by appropriate ignition members or devices, such as by a fuse material, as described with respect to FIG. 1. Member 60 provides support for battery cell stacks 12 and conducts heat generated by generating means 62 and 64 to all portions of the battery cell stacks. With such a system, the battery cell stacks may all be connected in electrical series for a single high-voltage output or one or more of the stacks may be connected separately or in parallel to produce higher current and/or voltage pulses as may be desired.

Figure 4:
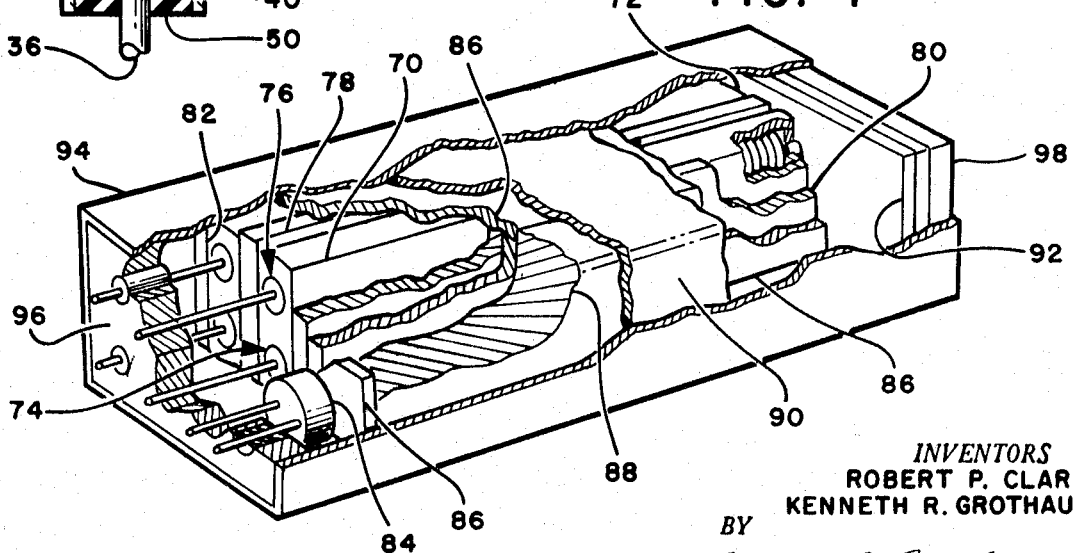
FIG. 4 is a perspective, partially cutaway view of a modified embodiment of a thermal battery constructed in accordance with this invention.

FIG. 4 illustrates an embodiment wherein the high heat conductive and electrical-insulative casing for the battery cell stacks includes more than one cavity for receiving battery cell stacks. In this embodiment, heat-conductive and electrical-insulative casings 70 and 72, of generally elongated and rectangular shape, include two cavities 74 and 76 having in each a stack of battery cells as shown in FIG. 2. The battery cell stacks in each casing may be connected in electrical series to provide separate outputs for each casing. In this type of arrangement, the heat-generating means may be arranged in strips 78, 80 and 82 along each side of the battery stack casing. The strips may be ignited by an appropriate electrical match 84 as described with respect to FIG. 1 through fuse material 86. The temperature produced by heat energy generated therein may be maintained by insulation 88, 90 and 92 in an appropriate manner and the entire assembly encased by shell 94 and headers 96 and 98. Insulative paththroughs, as shown, may be provided for the respective electrical leads in header 96.

Individual battery cells made of the specific materials cited above, may produce about 2½ to 3 volts per cell with a current of about 1 ampere per square inch. With a thermal battery as shown in FIG. 3, using eight beryllium oxide casings of about ⅛-inch inside diameter and 0.028-inch wall thickness and a total of 400 cells having an individual thickness of about 0.020 inch in a battery shell occupying less than 2 cubic inches and weighing less than 0.25 pounds, the battery may deliver about 3 milliamperes current at 1,000 volts for about 60 seconds duration. With a thermal battery constructed in accordance with the embodiment of FIG. 4, using 84 cells in a stack with two pairs of cell stacks connected in electrical series, two 3-milliampere 500-volt outputs of 50-second duration may be generated in a battery occupying a volume less than 1 cubic inch and weighing less than 0.09 pound. This latter embodiment utilized an outer layer of silica and aluminum insulation about 0.025 inch thick. With additional insulation, the output pulse may be extended to almost any desired length, such as up to 5 or 6 minutes.

What is claimed is:

1. A high-voltage, miniaturized thermal battery comprising an enclosure; a heat-conductive and electrical-insulative casing having an elongated internal cavity and an outer surface within said enclosure; a plurality of electrical battery cells stacked in said casing cavity each including spaced-apart anode and cathode electrodes and a normally solid fusible electrolyte pellet sandwiched between said electrodes, said cathode and anode electrodes of contiguous cells having surfaces lying against each other and with marginal portions thereof and of the pellets in electrical and heat conductive contact with wall portions of said casing cavity; and means for generating heat disposed about the outer surface of said casing.

2. The battery of claim 1 having heat insulation disposed about said heat-generating means for containing heat of said heat-generating means and for maintaining temperature of said casing and cells.

3. The battery of claim 1 wherein said heat-generating means is a pyrotechnic and said battery includes means for initiating the pyrotechnic.

4. The battery of claim 1 having a plurality of said casings, each filled by a stack of cells.

5. The battery of claim 1 wherein said anode and cathode comprise a unitary calcium-iron electrode.

6. The battery of claim 1 wherein said electrolyte pellet includes a binder of finely divided silica.

7. The battery of claim 1 wherein said casings are tubular.

8. The battery of claim 7 wherein said tubular casings are disposed within passageways of a metallic supporting member.

9. The battery of claim 8 wherein said supporting member is of tubular shape with said passageways disposed longitudinally thereabout.

10. The battery of claim 1 wherein said casings include a plurality of cavities, each filled with a battery cell stack.

* * * * *